Patented Feb. 21, 1928.

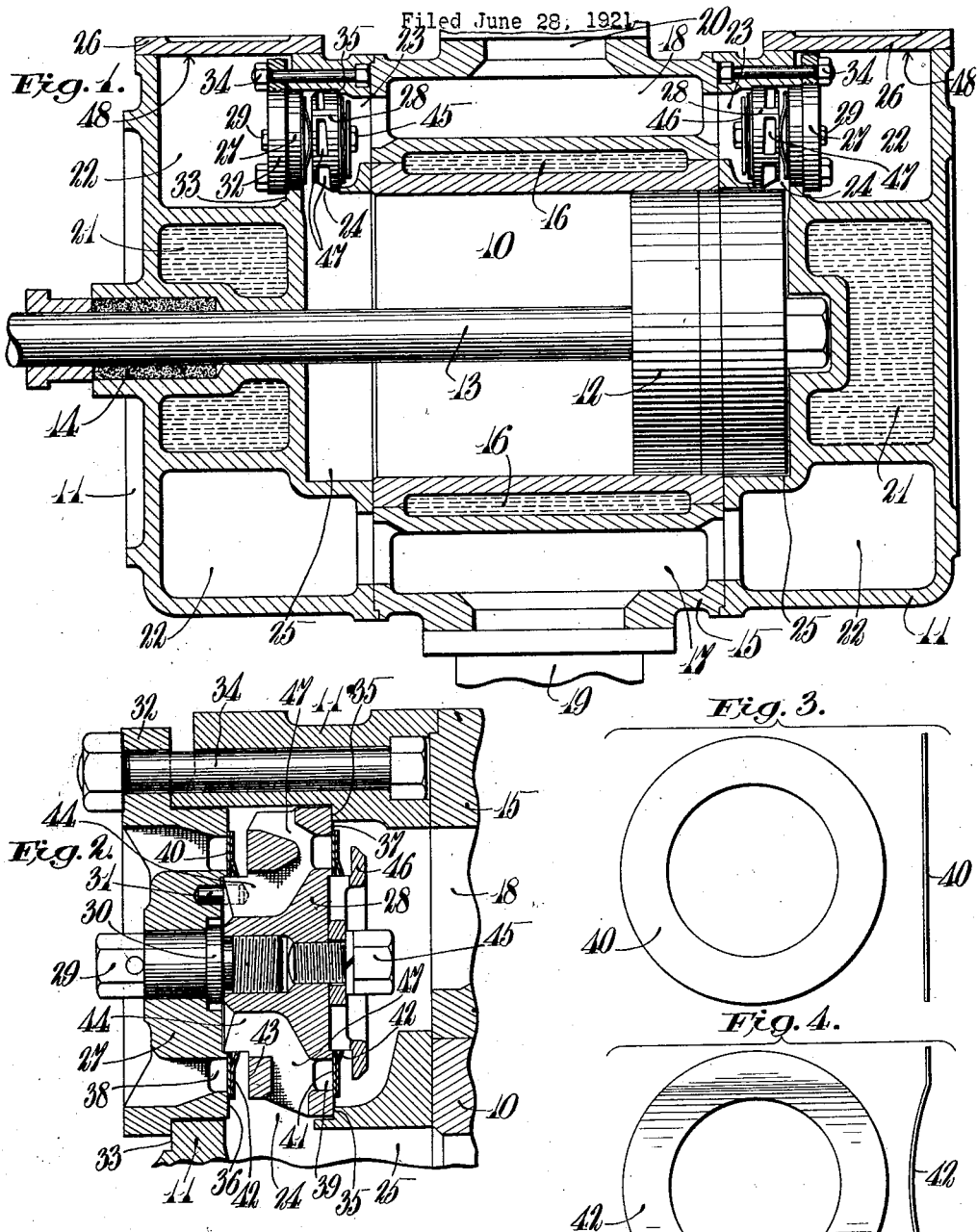

1,659,814

UNITED STATES PATENT OFFICE.

FRANK A. HALLECK, OF CHICAGO, ILLINOIS, ASSIGNOR TO SULLIVAN MACHINERY COMPANY, A CORPORATION OF MASSACHUSETTS.

VALVE.

Application filed June 28, 1921. Serial No. 481,143.

This invention relates to valves for compressors and the like.

It has for an object to provide a combined inlet and discharge valve structure adapted to be applied to and removed from the compressor cylinder as a unit, and comprising a single valve cage carrying both the inlet and discharge valves, the device being of compact construction, efficient in operation, and adapted to reduce the clearance or dead air space in the cylinder to a minimum.

The foregoing and other objects of the invention, together with means whereby the same may be carried into effect, will best be understood from the following description of one form or embodiment thereof illustrated in the accompanying drawings, in which:

Fig. 1 is a longitudinal section of a compressor cylinder having inlet and discharge chambers or passages and inlet and discharge valves constructed and arranged in accordance with the invention.

Fig. 2 is an enlarged longitudinal section of one of the combined inlet and discharge valve units and portions of the engine cylinder adjacent thereto.

Figs. 3 and 4 are detail views of one of the valves and its cooperating spring.

The compressor shown in Fig. 1, which is of the double acting type, comprises a cylinder 10 provided with heads 11 and containing a piston 12 provided with a piston rod 13 which passes through a stuffing box 14 in one of said heads. Surrounding the cylinder 10 is a jacket 15 forming with the cylinder wall a space 16 for the circulation of cooling water, said jacket being formed at its opposite sides with intake and discharge chambers 17 and 18 communicating with intake and discharge conduits 19 and 20, respectively. Each of the cylinder heads 11 is formed with a space 21 for the circulation of cooling water, with an intake chamber 22 communicating with the intake chamber 17 of the cylinder jacket 15, and with a valve chamber 23 communicating at one end with the intake chamber 22, at the opposite end with the discharge chamber 18 of the cylinder jacket, and at one side, through a lateral port 24, with a space 25 in the cylinder head constituting a continuation of the cylinder 10. Each of the intake chambers 22 in the heads 11 is formed, adjacent the corresponding valve chamber 23, with a lateral opening 48 closed by a detachable cover plate 26.

Located in each of the valve chambers 23 is a valve cage comprising two parts 27 and 28 connected by a centrally disposed bolt or stud 29 and angularly positioned by dowels 31. The stud 29 has threaded engagement with the cage part 28 and is formed with a flange or collar 30 received in a coaxial recess in the cage part 27 and bearing against the bottom of said recess. A pin 30' passing through the stud 29 at the opposite side of the part 27 from the collar 30 holds the stud against all but rotary movement in the part 27. The part 27 is formed with a flange 32 seated on a shoulder 33, formed in the head 11 at the junction of the intake chamber 22 and valve chamber 23, and is secured thereto by bolts 34. The part 28 is seated upon a shoulder 35 formed in the valve chamber 23 adjacent the lateral opening 24, and may be forced into close engagement with said shoulder, after the part 27 has been secured in place by the bolts 34, by operation of the stud 29 which thus serves as means for adjusting the cage part 28, the dowels 31 holding the part 28 against rotation when said stud is turned. It will be observed that the valve cage described, while composed of two connected parts, comprises in effect a single structure which may be inserted or removed as a unit through the lateral opening 48 in the cylinder head.

The valve cage parts 27 and 28 are formed with parallel annular valve seats 36 and 37, respectively, the valve seat 36 surrounding an annular port 38 formed in the part 27 and providing communication between the intake chamber 22 and valve chamber 23, and the valve seat 37 surrounding an annular port 39 formed in the part 28 and providing communication between the valve chamber port 24 and the discharge chamber 18. Cooperating with the valve seats 36 and 37 are annular inlet and discharge valves 40 and 41 adapted respectively to control the flow of fluid between the intake chamber and the cylinder and between the cylinder and the discharge chamber. In the construction shown, the valves 40 and 41 are of the type disclosed and claimed in an application of Fred D. Holdsworth, Ser. No. 142,706, filed Jan. 16, 1917, said valves being preferably composed of sheet steel, being of flat annular form as shown in Fig. 3, and being held to their seats by valve springs 42 preferably formed of thin resilient sheet metal, said springs having bowed central portions and flattened ends as shown in Fig. 4. The valve cage part 28 is formed with a shoulder 43 constituting an abutment for the spring 42 controlling the valve 40, and with wing portions 44 engaging the part 27 and constituting guides for said valve and spring. Secured to the part 28 by a cap screw 45 is a combined guide and abutment member 46 for the valve 41 and spring 42 controlling the same. The guide wings 44 serve as means for spacing the body of the part 28 from the part 27 in order to provide a space for the flow of fluid from the port 38 to the port 24, and said part 28 is formed with lateral passages 47 forming communication between said port 24 and the port 39. In the construction shown, the passages 47 are arranged in a radial series extending completely about the valve cage, being of progressively decreasing size from the side of said cage adjacent the port 24 to the diametrically opposite side.

From the foregoing description it will be seen that the invention provides a compact and convenient cylinder and inlet and discharge chamber arrangement, as well as an efficient and extremely small and compact valve mechanism which permits the ready removal of the valves for purposes of repair or replacement and in which the clearance space is reduced to a minimum.

While I have in this specification described and shown one embodiment which my invention may assume in practice, it will be understood that the particular construction and arrangement shown and described have been chosen for illustrative purposes merely, and that the invention may be otherwise embodied and practiced without departing from its spirit or the scope of the claims hereunto appended.

What I claim as new and desire to secure by Letters Patent is:—

1. In a compressor, the combination with a cylinder, of a combined inlet and discharge valve structure attachable to and detachable from said cylinder as a unit and including means for maintaining the parts thereof relatively immovable when detached from the cylinder but permitting relative separable adjustment thereof and maintaining the same in fixed adjusted position.

2. In a compressor, the combination with a cylinder, of a valve cage structure providing a plurality of valve seats attachable to and detachable from said cylinder as a unit and including means for maintaining the parts thereof relatively immovable when detached from the cylinder and adjustable to alter the relative spacing of said parts, and inlet and discharge valves cooperating with said seats respectively.

3. In a compressor, a single valve cage provided with a plurality of parallel similarly facing annular valve seats, said valve cage being attachable to and detachable from the compressor as a unit and including means for maintaining the parts thereof in a predetermined relative position when said cage is detached from the compressor and adjustable to alter the relative position of said parts, and flat annular inlet and discharge valves cooperating with said seats respectively.

4. In a compressor, a single valve cage provided with a plurality of parallel annular valve seats and means effective when the valve cage is removed from the compressor to hold said valve seats in relatively fixed position and operable to effect relative adjustment thereof, flat annular inlet and discharge valves cooperating with said seats, respectively, and annular transversely bowed springs for controlling said valves.

5. In a compressor, the combination with a cylinder structure including a head, of a valve cage having a flange bolted to said cylinder structure, said cage comprising means affording a plurality of valve seats maintained rigidly in a predetermined relation to each other when said cage is removed from a cylinder, and inlet and discharge valves cooperating with said seats respectively.

6. In a compressor, a unitary valve cage provided with a plurality of valve seats bearing a fixed predetermined relation to each other and facing in the same direction and with lateral spaces or passages between said seats, and inlet and discharge valves cooperating with said seats respectively.

7. In a compressor, the combination with a cylinder, of a unitary valve cage disposed at the side of said cylinder and provided with a plurality of valve seats and with lateral passages between said seats, said passages being disposed in a series extending around said cage and being of sizes which decrease progressively from the side of said cage adjacent said cylinder, and inlet and discharge valves cooperating with said seats respectively.

8. In a compressor, the combination with a cylinder, of a valve cage attachable to and detachable from the cylinder as a unit, said valve cage comprising two parts each provided with a valve seat facing in the same direction, an inlet valve cooperating with the seat of one of said parts, a discharge valve cooperating with the seat of the other of said parts, and means for maintaining said parts in solidly connected fixed predetermined relation, adjustable to vary such relation.

9. In a compressor, the combination with a cylinder, of a valve cage attachable to and detachable from the cylinder as a unit, said valve cage comprising two parts each provided with a valve seat facing in the same direction, an inlet valve cooperating with the seat of one of said parts, a discharge valve cooperating with the seat of the other of said parts, means for maintaining said parts in solidly connected fixed predetermined relation, adjustable to vary such relation, and means for attaching said valve cage to the cylinder, the attaching means being adapted to be operated wholly from the side of the cylinder on which the insertion is made.

10. In a compressor, a valve cage comprising two connected parts each provided with a valve seat, a centrally disposed bolt or stud for adjustably securing said parts together in different rigid relations, an inlet valve cooperating with the seat of one of said parts, and a discharge valve cooperating with the seat of the other of said parts.

11. In a compressor, the combination with a cylinder structure including a head and having a valve chamber and two shoulders adjacent said valve chamber, of a valve cage comprising two parts, one of said parts being secured to one of said shoulders, means connected to said last named part for forcing the other of said parts into engagement with the other of said shoulders and constituting means for holding said parts in fixed space relation on removal from said cylinder, an inlet valve cooperating with the valve seat of one of said parts, and a discharge valve cooperating with the seat of the other of said parts.

12. In a compressor, the combination with a cylinder, of a valve cage attachable to and detachable from the cylinder as a unit, said valve cage comprising two connected parts provided respectively with parallel annular valve seats, a centrally disposed bolt for securing said parts together in different predetermined fixed space relations, said bolt being adapted to adjust the amount of said spacing, a flat annular inlet valve cooperating with the seat of one of said parts, and a flat annular discharge valve cooperating with the seat of the other of said parts.

13. In a compressor, the combination with a cylinder structure including a cylinder head and having a valve chamber and shoulders adjacent said valve chamber, of a valve cage comprising two connected parts each provided with a valve seat, one of said parts having a flange bolted to one of said shoulders, a stud connecting said parts and adapted to force the other of said parts into engagement with the other of said shoulders, an inlet valve cooperating with the seat of said first named part, and a discharge valve cooperating with the seat of the other of said parts.

14. In a compressor, a valve cage comprising two connected parts, each provided with a valve seat, an inlet valve cooperating with the seat of one of said parts, a discharge valve cooperating with the seat of the other of said parts, one of said parts constituting a guide for the valve seated on the other of said parts and being provided with flow passages for the fluid passing said valve, and means concentric with said parts for holding them assembled.

15. In a compressor, a valve cage comprising two connected parts, each provided with a valve seat, means disposed coaxially of said seats for effecting adjustments therebetween to different fixed relations, and inlet and discharge valves cooperating with said seats respectively, one of said parts constituting a guide for the valve seated on the other of said parts.

16. In a compressor, a valve cage comprising two connected parts each provided with a valve seat, an inlet valve cooperating with the seat of one of said parts, a discharge valve cooperating with the seat of the other of said parts, said last named part constituting a guide for said inlet valve, a separate guide for said discharge valve secured to said last named part, and means concentric with said parts for holding them assembled.

17. In a compressor, a valve cage comprising two connected parts each provided with a valve seat, an inlet valve cooperating with the seat of one of said parts, a discharge valve cooperating with the seat of the other of said parts, said last named part constituting a guide for said inlet valve and being provided with flow passages for the fluid passing said valve, a separate guide for said discharge valve secured to said last named part, and means concentric with said parts for holding them assembled.

18. In a compressor, a valve cage comprising two connected parts each provided with an annular valve seat, a flat annular inlet valve cooperating with the seat of one of said parts, a flat annular discharge valve cooperating with the seat of the other of said parts, transversely bowed annular springs for controlling said valves, said last named part constituting a guide for said inlet valve and an abutment for the inlet valve spring, and a separate guide and abutment for said discharge valve and spring secured to said last named part.

19. In a compressor, the combination with a cylinder structure including a cylinder head, said structure having inlet and discharge chambers and a valve chamber between said inlet and discharge chambers communicating with the interior of said cylinder, of a unitary valve cage structure comprising a plurality of relatively adjustable parts and means for maintaining them constantly, whether in said chamber or removed, in fixed relation, disposed in said valve chamber, and valves carried by said cage one controlling fluid flow between said valve chamber and said inlet chamber and another controlling fluid flow between said valve chamber and said discharge chamber.

20. In a compressor, the combination with a cylinder structure including a cylinder head, said structure having inlet and discharge chambers and a valve chamber between said inlet and discharge chambers and communicating with the interior of the cylinder, of a unitary valve cage structure comprising a plurality of relatively adjustable parts and means for maintaining them constantly in fixed space relation, disposed in said valve chamber, one of said chambers having an opening through which said valve cage may be inserted or removed, a removable cover for said opening, and valves carried by said cage for controlling fluid flow between said valve chamber and said inlet and discharge chambers, respectively.

21. In a compressor, the combination with a cylinder structure including a cylinder head, said structure having inlet and discharge chambers and a valve chamber between said inlet and discharge chambers and communicating with the interior of the cylinder, of a unitary valve cage structure comprising a plurality of relatively adjustable parts and means for maintaining them constantly in fixed space relation, disposed in said valve chamber, said inlet chamber having an opening through which said valve cage may be inserted and removed, a removable cover for said opening, and valves carried by said cage for controlling fluid flow between said valve chamber and said inlet and exhaust chambers, respectively.

22. In a compressor, the combination with a cylinder structure comprising a head and having inlet and discharge chambers and a valve chamber between said inlet and discharge chambers, said valve chamber being located at one side of the cylinder and communicating with the interior thereof, of a unitary valve cage structure comprising a plurality of relatively adjustable parts and means for maintaining them constantly in fixed space relation, disposed in said valve chamber, and valves carried by said cage for controlling fluid flow between said valve chamber and said inlet and exhaust chambers, respectively.

23. In a compressor, the combination with a cylinder structure including a cylinder head, said structure having inlet and discharge chambers and a valve chamber between said inlet and discharge chambers and communicating with the interior of the cylinder, of a unitary valve cage structure comprising a plurality of relatively adjustable parts and means for maintaining them constantly in fixed space relation, disposed in said valve chamber and provided with a plurality of valve seats and with lateral passages between said seats, and valves cooperating with said seats for controlling fluid flow between said valve chamber and said inlet and exhaust chambers, respectively.

24. In a compressor, the combination with a cylinder having a head provided with a valve chamber, of a unitary valve cage structure comprising relatively adjustable valve seat parts adapted to bear a fixed relative relation to each other when removed from said compressor and adapted for insertion in said valve chamber and provided with inlet and discharge valves.

25. In a compressor, the combination with a cylinder having inlet and discharge chambers, and a cylinder head provided with a valve chamber communicating with the interior of said cylinder, said head having an inlet chamber communicating with said valve chamber and with the inlet chamber of said cylinder, of a unitary valve cage structure comprising valve seat parts and means for holding them mutually relatively immovable when removed from said compressor and assembled for insertion as a unit in said valve chamber, and valves carried by said cage for controlling communication between said valve chamber and said inlet and discharge chambers, respectively.

26. In a compressor, a valve chamber having spaced shoulders affording spaced parallel supporting abutments, and a valve cage removably mounted in said valve chamber, said valve cage comprising a plurality of parts which are insertable as a unit, and being adjustable in length to cause the same to engage both of said shoulders simultaneously, said cage comprising means whereby the component parts of said cage are maintained in fixed space relation when said cage is removed from the valve chamber.

27. In a compressor, the combination with a cylinder, of a unitary valve mechanism disposed at the side of the cylinder and provided with a plurality of plane valve seats respectively disposed in different planes, and with lateral passages between said seats, said passages being disposed in a series extending around said cage and being of sizes which decrease progressively from the side of the cage adjacent the cylinder, and inlet and discharge valves cooperating with said seats respectively.

28. In a valve mechanism, relatively movable seat members, means for connecting the same comprising a threaded element mounted for rotation and held against longitudinal movement in either direction in one of said members, and means carried by the other member cooperating with the threaded portion of said element.

29. In a valve mechanism, relatively movable seat members, means for connecting the same comprising an element mounted for rotation and held against longitudinal movement in either direction in one of said members, and means permitting by rotation of said element operative connection between said members to effect a fixed axial relation therebetween.

In testimony whereof I affix my signature.

FRANK A. HALLECK.